US005661468A

United States Patent [19]

Marcoux

[11] Patent Number: 5,661,468

[45] Date of Patent: *Aug. 26, 1997

[54] RADIO PAGING ELECTRICAL LOAD CONTROL SYSTEM AND DEVICE

[76] Inventor: Paul Alfred Marcoux, 34 Lincoln Ave., Central Falls, R.I. 02863

[ * ] Notice: The term of this patent shall not extend beyond the expiration date of Pat. No. 5,623,256.

[21] Appl. No.: 571,668

[22] Filed: Dec. 13, 1995

Related U.S. Application Data

[63] Continuation of Ser. No. 356,665, Dec. 15, 1994, Pat. No. 5,623,256.

[51] Int. Cl.[6] .............................. G08B 5/22; G05B 23/02; H05B 37/02; E01F 9/00

[52] U.S. Cl. .............................. 340/825.44; 340/825.06; 340/825.72; 315/153; 315/315; 362/153.1; 362/802

[58] Field of Search .............................. 340/825.06, 825.44, 340/825.47, 825.69, 825.72; 315/153, 159, 312, 315, 316; 362/153.1, 233, 802

[56] References Cited

U.S. PATENT DOCUMENTS

| | | | |
|---|---|---|---|
| 3,971,028 | 7/1976 | Funk | 343/225 |
| 4,242,614 | 12/1980 | Vatis et al. | 315/153 |
| 4,355,309 | 10/1982 | Hughey et al. | 340/825.53 |
| 4,590,471 | 5/1986 | Pieroway et al. | 340/825.69 |
| 4,656,475 | 4/1987 | Miller et al. | 340/825.06 |
| 4,731,551 | 3/1988 | Gibbs et al. | 315/159 |
| 4,755,792 | 7/1988 | Pezzolo et al. | 340/825.06 |
| 4,780,621 | 10/1988 | Bartleucci et al. | 307/11 |
| 4,885,766 | 12/1989 | Yasuoka et al. | 379/105 |
| 4,962,522 | 10/1990 | Marian | 379/5 |
| 5,061,921 | 10/1991 | Lesko et al. | 340/815.24 |
| 5,132,596 | 7/1992 | Walters et al. | 315/159 |
| 5,148,158 | 9/1992 | Shah | 340/825.17 |
| 5,337,044 | 8/1994 | Folger et al. | 340/825.44 |
| 5,382,947 | 1/1995 | Thaler et al. | 340/825.72 |

*Primary Examiner*—Michael Horabik
*Assistant Examiner*—Edward Merz
*Attorney, Agent, or Firm*—Russell & Russell, L.L.P.

[57] ABSTRACT

A system for remote control of electrical load devices, particularly electrical lighting where the commands are broadcast over a radio pager system. A radio pager receiver is located within or nearby the electrical light fixture and is normally in a standby state, receives the commands broadcast. The radio pager receiver is connected to a computer processor and electronic circuitry. The computer processor interprets the commands and instructs the electronic circuitry to perform a desired operation. These operations include but are not limited to turning an electrical light element or group of electrical light elements on or off, dimming the light element or reprogramming the electrical light element to be included in a different control group of lights. Before the operation is accomplished, the computer processor checks for the appropriate security code entry. In addition, there are protection mechanisms built into the computer processor so that if the decoding of the commands indicates that a large block of devices is to be turned on at the same time, the operation will be staggered so as to prevent a huge inrush of current. One preferred embodiment of this device is to be installed in a typical exterior roadway light fixture.

27 Claims, 12 Drawing Sheets

RADIO PAGING ELECTRICAL LOAD CONTROL DEVICE

RADIO PAGING ELECTRICAL LOAD CONTROL DEVICE

RADIO PAGING ELECTRICAL LOAD CONTROL DEVICE REPROGRAMMING

RADIO PAGING ELECTRICAL LOAD CONTROL SYSTEM

RADIO PAGING ELECTRICAL LOAD CONTROL SYSTEM

RADIO PAGING ELECTRICAL LOAD CONTROL SYSTEM AND DEVICE

This application is a continuation application of U.S. Patent and Trademark Office application Ser. No. 08/356,665, filed on Dec. 15, 1994, now U.S. Pat. No. 5,623,256.

BACKGROUND OF THE INVENTION

The field of the present invention relates generally to the remote control of electrical apparatus and, more particularly, to an apparatus and method of using a radio paging network and radio pager receiver to transmit and receive remotely programmable digital command codes which will selectively control the state and intensity of remotely located electrical light or other electrically powered devices, either individually or together in a preprogrammed set. When the radio paging electrical load control system is used to control lighting within an office building, for example, the user is allowed the flexibility of controlling the electrical lighting or other devices within an entire building, entire floors, a specific office light or any portion thereof or almost any combination of multiple individual devices or sub-unit devices on a floor within a building or any other area requiring remote control systems. In addition, the radio paging electrical load control system allows remote reprogramming of the number of electrical light or devices to allow an almost infinitely variable combination of controllable sets of electrical lights or devices. The system also provides an infrared line-of-sight transmitter which allows for on-site manual override. In addition, a manual hardwired override capability can be included.

Attention is called to U.S. Pat. Nos. 3,971,028; 4,242,614; 4,355,309; 4,590,471; 4,780,621; 4,885,766; 4,962,522; 5,061,921; 5,148,158 and 5,337,044.

As energy costs increase, businesses, especially those located in large, high-rise office buildings, have looked for ways to increase energy savings and to lower electrical power bills. Electrical power companies, faced with shortages of electrical power, especially during peak loading times, often offer businesses incentives to quickly cut power consumption. Those incentives often involve cutting or reducing the use of electricity during peak periods as well as controlling demand loading by reducing lighting levels, staggering lighting energizing at business startup time and after a power outage.

Besides reducing electricity bills, flexibility in arranging lights in groupings that can be remotely programmed and controlled is desirable. The ability to quickly and remotely reprogram electrical light groupings in accordance with changing office needs is also desirable. In large office buildings there is a need to quickly and easily switch electrical light groupings according to the needs of different occupants or to accommodate changing needs of the same occupants.

In addition to the remote control capability, an on-site remote control or hardwired override capability for normal operation, reprogramming, testing or emergency situations is also needed.

Previous systems have relied on various methods of remotely controlling lights, with some systems sending a radio transmission using pulse width modulation or other non-digital transmission techniques to a radio receiver. Although generally reliable, these systems are expensive, both to manufacture and to install. In addition, they may be susceptible to noise and not include error detection capabilities.

For the foregoing reasons, there is a need for a system to remotely control electrical apparatus, particularly lights that is quick easy to use, accurate, secure, low cost and reliable which provides the ability to remotely program and control a portion of an electrical light fixture or group of fixtures as well as manual on-site override capability.

SUMMARY OF THE INVENTION

The present invention is directed to a system, device and method of use that satisfies these needs. The present invention provides a system, device and method of use for the control of electrical apparatus, particularly lights that is quick, easy to use, accurate, secure, low cost and reliable which provides the ability to remotely program and control an electrical light fixture or group of fixtures as well as manual on-site override capability.

A radio paging electrical load controlling system having features of the present invention comprises a means of communicating with an existing radio paging network and a radio paging electrical load control device located within or nearby an electrical light fixture. Communication with the radio paging network may be made by accessing the radio paging network via a phone line. Commands are entered either by a computer and modem connected to the phone line or by an operator manually entering the commands via the phone itself. Once the required security and action command codes are received by the radio paging network, the network sends a signal containing the commands to a radio paging electrical load control device, located within or nearby an electrical light fixture or fixtures, which contains an individual radio paging receiver, which is left in a continuous standby mode. The radio paging electrical load control device also comprises a decoder, central processing unit (CPU), memory device and lighting control module. The decoder and processor recognize and decode the commands. An electronic circuit then performs the command that was transmitted. In addition, there are protection mechanisms built into the CPU program so that if the decoding of the command codes indicates that a large block of devices is to be turned on or off at the same time, it will stagger the operation so as to prevent a huge inrush of current and eliminate the potential for tripping of the building's main electrical overcurrent device or circuit. For those buildings, or locations within a building that prevent radio signal reception, the control device can be hardwired to a control mechanism, such as a traditional light switch, remote receiver or an infrared override can be used.

Current network pager technology can be used because it is adequate to transmit the desired command control codes and is presently reliable and low cost. The present invention can be easily changed in the future to adapt to any significant advances in paging technology such as alpha numeric, digital voice or increased bandwidth simply by changing the command code structure.

In the present method, a radio pager network is accessed by a telephone and commands are transmitted to the existing radio pager network. The entry can be done manually by a person entering the codes or by a computer which is preprogrammed to enter the codes automatically or when the program is actuated by a user or by voice control. At the present time, this invention makes use of a radio pager network capable of transmitting up to 26 digits. Therefore, at the present time, the command control codes use up to 26 digits which provide for an almost infinite number of possibilities with regard to command control codes. In the future, expansion of digits and alphanumeric commands can be added to the system to allow for future expansion of the command code format.

After accessing the paging network, the security code is entered and verified upon reception by the radio paging electrical load control device. The security code may be followed by a command code. The command code provides the data necessary to locate a particular building, floor and electrical light fixture or group of electrical light fixtures, the number of ballasts to be controlled per device and can also contain a reprogramming code. The command code format contains a primary group load code, a secondary group load code, a unit circuit code, a unit load code, a sub-unit load code, a load action code and/or a reprogramming code. The primary group load code indicates the particular building and all lighting fixtures therein; the secondary group load code indicates the floor and all lighting fixtures thereon; the unit circuit code indicates the particular portion of the device(s) to be controlled on a floor; and the unit load code indicates the individual lighting fixture and the sub-unit load code indicates the number of fluorescent lighting ballasts to be controlled per unit. The load action code indicates whether the device or group of devices is to be turned on or off or to some variable level. The reprogramming code indicates that a reprogramming of a device or group of devices is about to be accomplished.

Another embodiment of this invention is where installation is in an exterior lighting fixture, as for example, exterior roadway lighting to allow a single electric light or group of lights to have its security, control, activation and or security code changed remotely. After accessing the paging network, the security code is entered and verified upon reception by the radio paging electrical load control device. The security cede may be followed by a command code. The command code provides the data necessary to locate a particular exterior electrical light fixture or group of electrical light fixtures, the number of ballasts to be controlled per device and can also contain a reprogramming code. The command code format contains a primary group load code, a secondary group load code, a unit circuit code, a unit load code, a sub-unit load code, a load action code and/or a reprogramming code. The primary group load code, for example, may indicate the particular state or other geographic location and all lighting fixtures within that geographic boundary; the secondary group load code may indicate, for example, the city or other geographic location and all lighting fixtures within that geographic boundary; the unit circuit code may indicate, for example, the particular group of lighting fixtures within that city or geographic location to be controlled; and the unit load code indicates the individual lighting fixture and the sub-unit load code indicates the number of lighting ballasts to be controlled per unit. The load action code indicates whether the device or group of devices is to be turned on or off or to some variable level. The reprogramming code indicates that a reprogramming of a device or group of devices is about to be accomplished.

If a reprogramming operation is desired, that is, a reprogramming of the electrical light fixtures to be grouped together so as to be able to be controlled together, once the radio pager receiver within the electrical light fixture receives the correct security and reprogramming code, the radio pager electrical load control device will begin the reprogramming operation. The reprogramming operation involves identifying the current device or group of devices and transmitting a new code to reprogram the current device or group of devices. The reprogramming commands are transmitted to the processor and the memory is changed. A non-volatile, electrically erasable programmable read only memory (EEPROM) is used in the present invention, but other types of reprogrammable memory now known or available in the future may be used. Should a power interruption occur, the non-volatile memory saves the last set of conditions so that when power is eventually returned, lighting will be reinitialized to the pre-power outage state.

The present invention also provides for an infrared remote control load override and reprogramming capability. This can be used for normal operation and reprogramming, and for initially grouping devices and testing those groups and individual devices or can be used in case of emergency to override the system. In addition, the control of the radio paging electrical load control device can be hardwired to provide for manual switch control.

BRIEF DESCRIPTION OF THE DRAWINGS

These and other features, aspects, and advantages of the present invention will become better understood with regard to the following description, appended claims, and accompanying drawings where:

FIG. 6(*b*) is a reprogramming operation command code format; and FIG. 6(*c*) is a security command code format.

DETAILED DESCRIPTION

Figure 1:
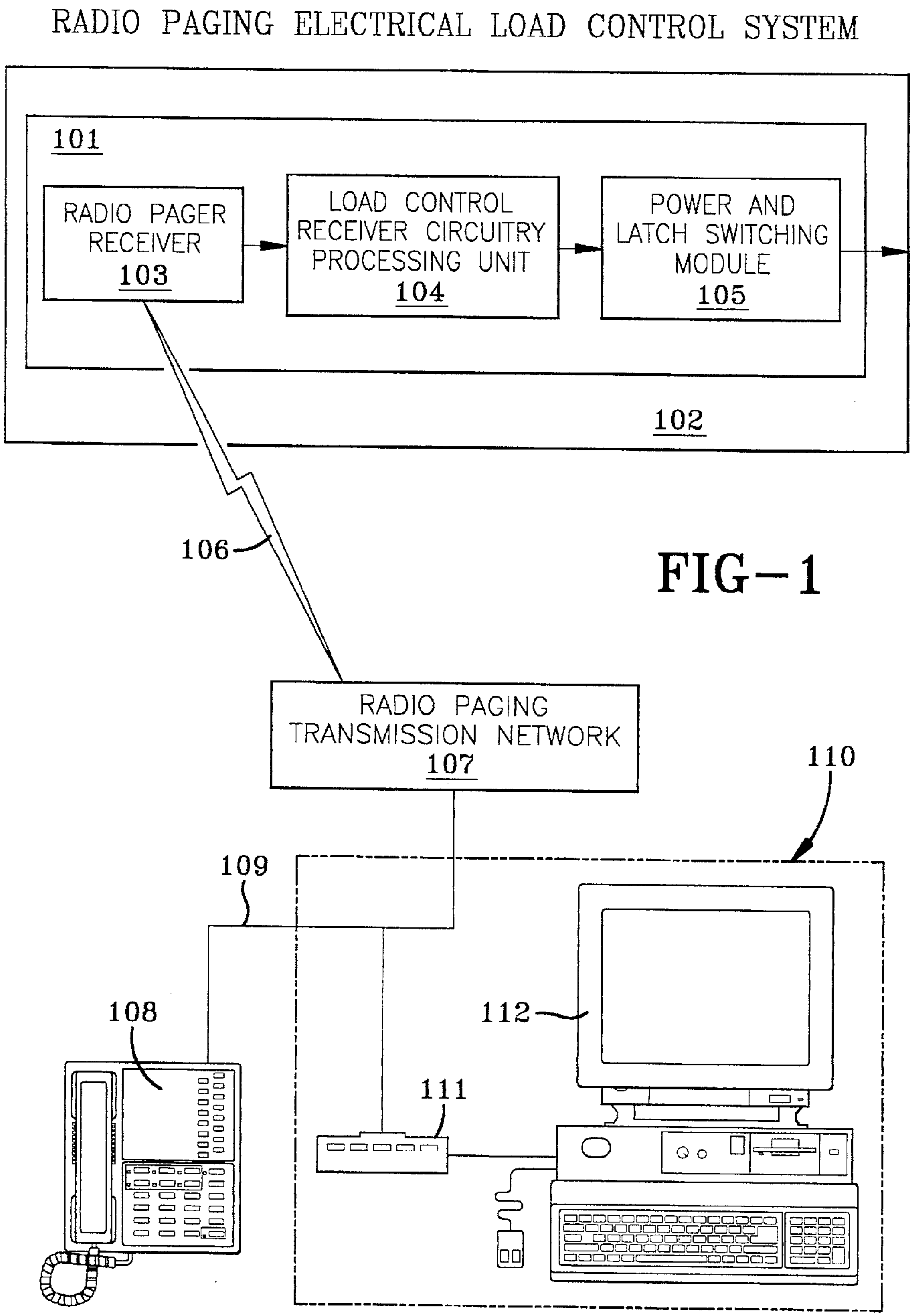
FIG. 1 shows a system diagram of a radio paging electrical load control system and a radio paging electrical load control device in accordance with a preferred embodiment of the present invention.

Turning now to FIG. 1, a preferred embodiment of the radio paging electrical load control system, is shown in accordance with the present inventive concept. In FIG. 1, a computer 112 is shown connected to a modem 111, which is in turn connected to a telephone network 109. The computer 112 provides a means of communicating with the radio paging network 107 via a telephone network 109. Alternately, a telephone 108 can be connected to the telephone network 109 to provide direct entry by a person of commands to be transmitted to the radio paging network 107. The paging network 107 sends the commands via a signal 106 entered via the computer 112 or the telephone 108 to the radio paging electrical load control device 101 of FIG. 1 which contains a radio pager receiver 103. The radio pager receiver 103 is located within an electrical lighting unit 102. The electrical lighting unit 102 also contains load control receiver circuitry processing unit 104 which is in turn connected to a power latch and switching module 105.

Figure 2:
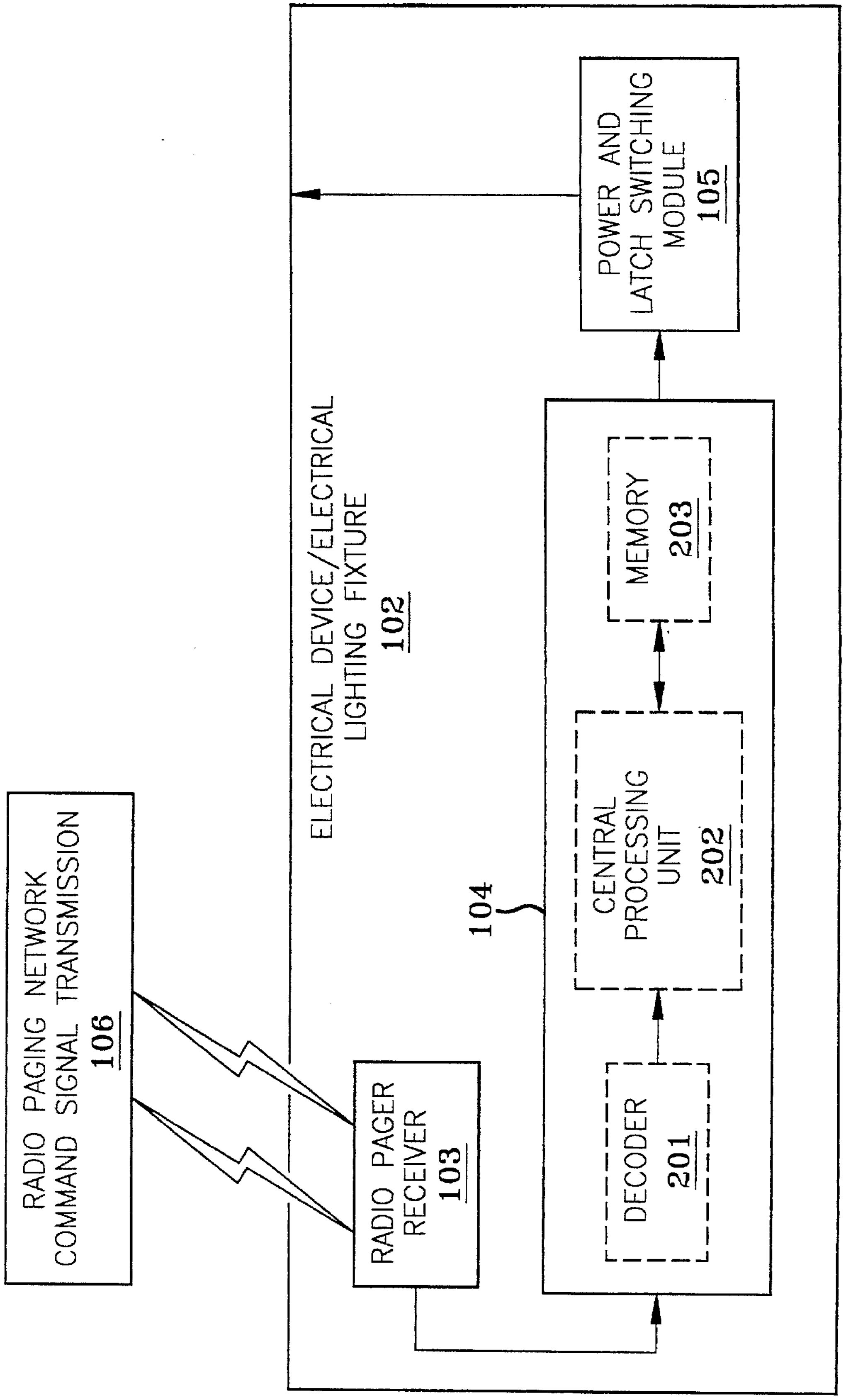
FIG. 2 is a block diagram of a radio paging electrical load control device.

Turning now to FIG. 2, a block diagram of the radio paging electrical load control device 101 of FIG. 1 is shown in accordance with present inventive concepts. The pager receiver 102 receives the command signal 106 from a remote location and forwards it to the load control receiver circuitry processing unit 104 which contains a decoder 201 which decodes the command signal 106, forwards it to the central processing unit (CPU) 202 which compares and interprets the decoded command to data stored in memory 203. Once the load control receiver circuitry processing unit 104 has completed its processing of the received command signal 106, it forwards the results to the power latch and switching module 105.

Figure 3:
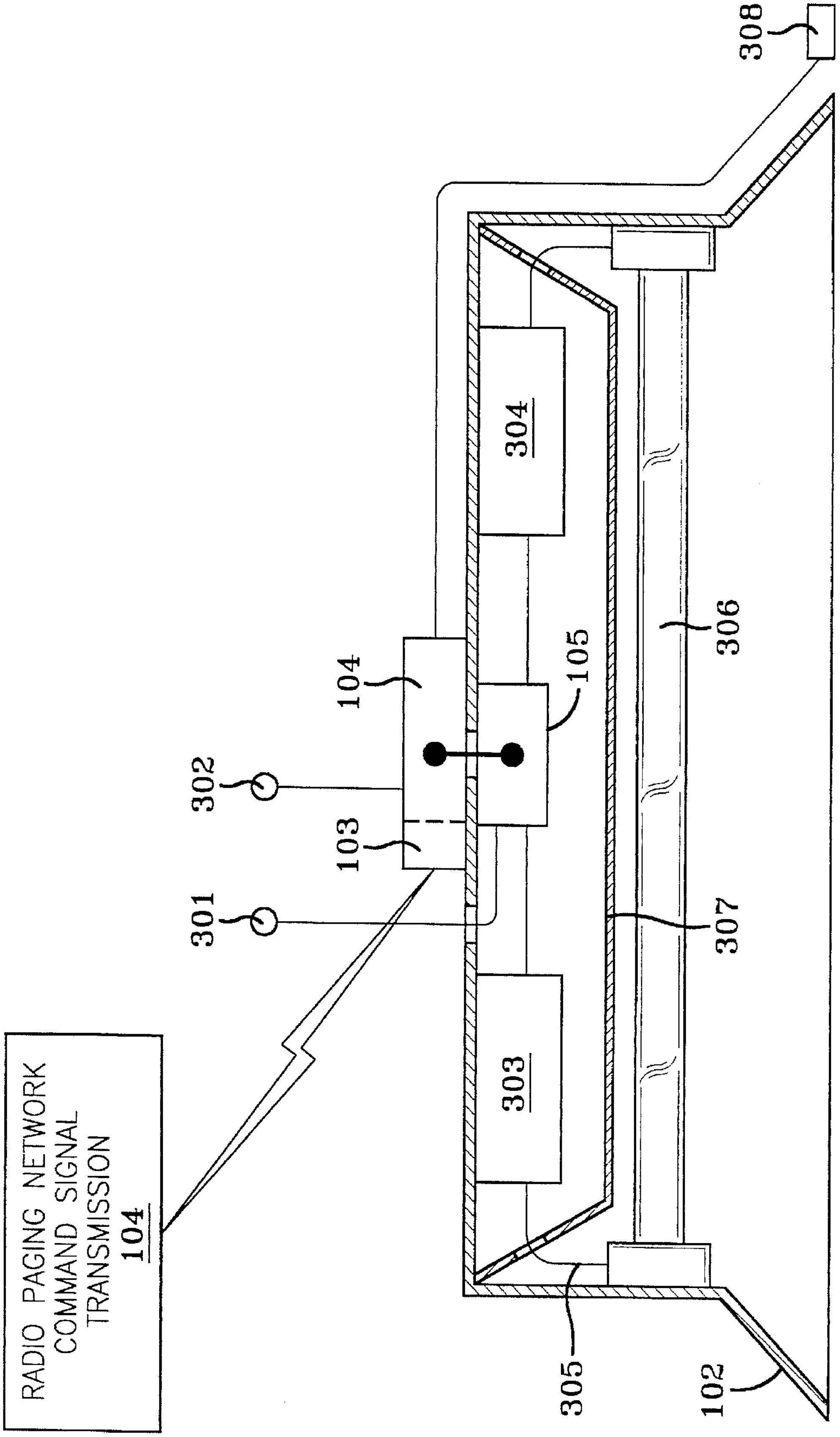
FIG. 3 is a side view of the radio paging electrical load control device as installed in a typical fluorescent light fixture in accordance with a preferred embodiment of the present invention.

Turning now to FIG. 3, a side view of a preferred embodiment of the radio paging electrical load control device 101 as installed in a typical fluorescent light fixture 103 is shown in accordance with present inventive concepts. The radio pager receiver 103 is installed external to the light fixture 102 and reflector 307 to receive the command signal 106 from a remote location and is connected to the power and latch switching module 105 which is in turn connected to the fluorescent lamp ballasts 303 and 304. Primary input power 301 is also connected to the power and latch switching module 105 and is also the power source for the radio paging electrical load control device 101. A local infrared receiving sensor 308 is connected to the load control receiver circuitry processing unit 104 to provide for local control of the lamp fixture 102.

Figure 4:
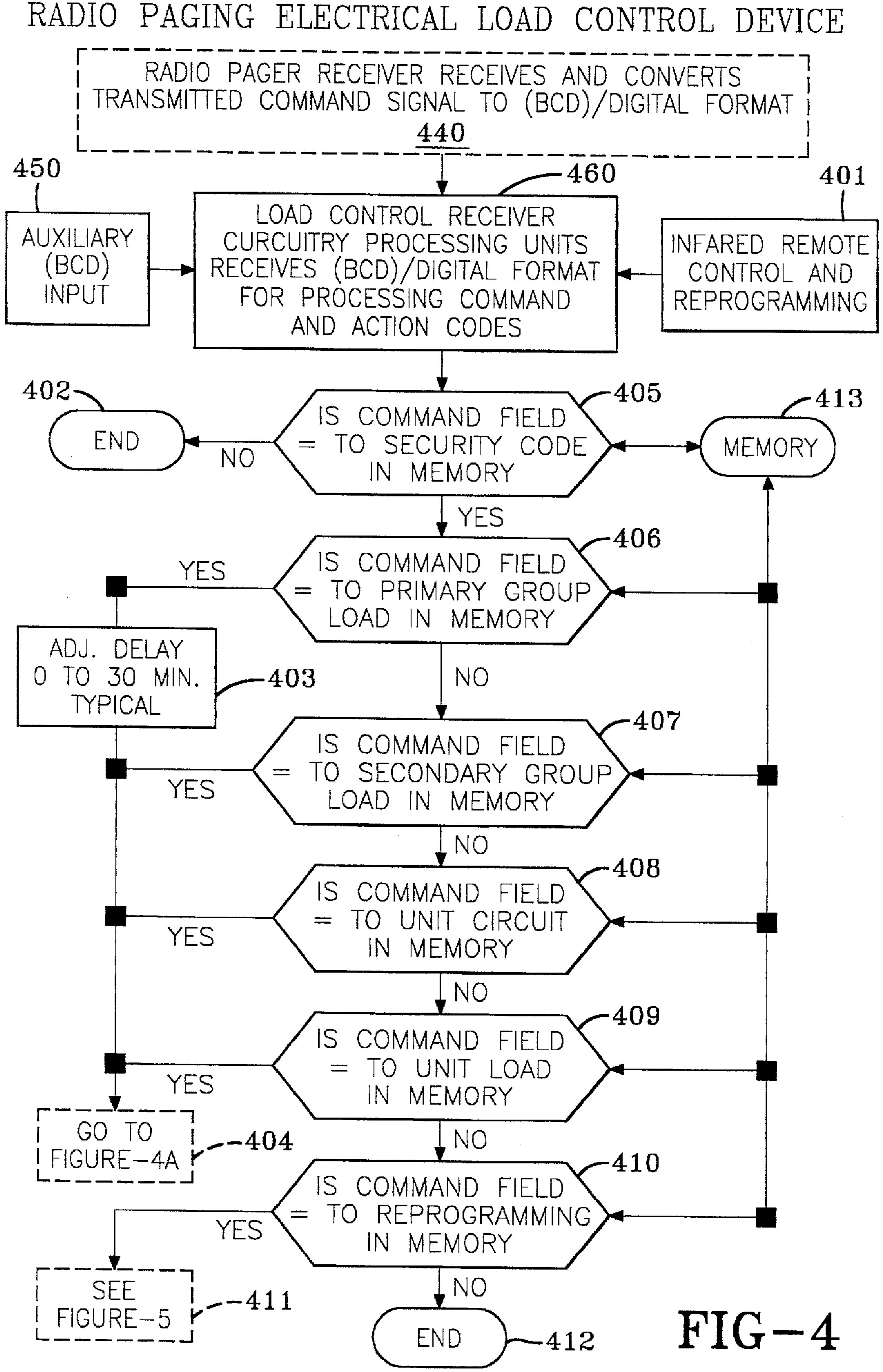
FIGS. 4 and 4A are flow charts illustrating the radio paging electrical load control system and device command operational sequence during normal operation in accordance with a preferred embodiment of the present invention.
Figure 4A:
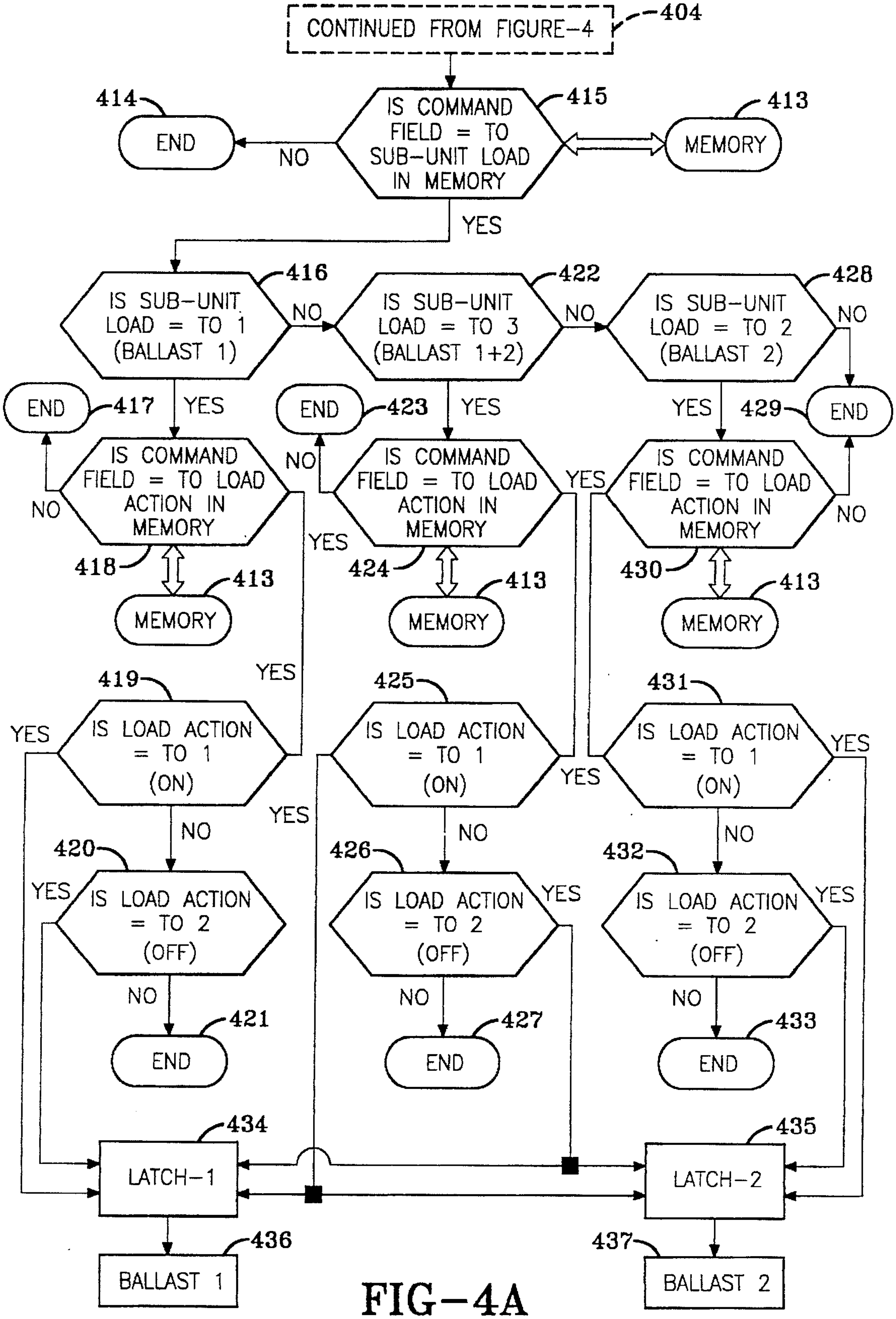

FIG. 4 is a flowchart describing the normal operation of a preferred embodiment of the radio paging load control system, in accordance with the present inventive concepts. At step 440, the radio paging network command signal transmission is received by the radio pager receiver and converted to Binary Coded Decimal (BCD) digital format. Alternatively, the command signal can be locally transmitted by infrared remote control step 401 or by auxiliary Binary Coded Decimal (BCD) input step 450. In all cases, the load control receiver circuitry processing unit receives the BCD digital format step 460. If the command field is not the correct security code step 405, processing ends step 402. If the command field is the correct security code step 405, the command fields are checked steps 406, 407, 408, 409, and 410 by accessing memory steps 413 to determine the command code action to be taken. If no command action code matches with memory, processing ends step 412. If the command field indicates a reprogramming action 410, the reprogramming operation is entered 411 and is described in FIG. 5. Otherwise, if the command field matches memory, the adjustable delay action step 403 is enacted and processing continues step 404. The sub-unit load code is checked step 415. If it does not match memory step 413, processing ends step 414. If it does match memory step 413, the sub-unit load code value is checked steps 416, 422, and 428 to determine whether ballast 1 step 416, ballasts 1 and 2 step 422 or ballast 2 step 428 are to be controlled. If no ballast or combination of ballasts is indicated, processing ends step 429. The command load action code steps 418, 424, and 430 matches memory step 413, the load action code is checked to determine whether the operation indicated is on or off steps 419, 425, 431, 420, 426, 432. If the command load action code steps 418, 424, 430 does not match memory step 413, the load action does not indicate an on or off action steps 419, 425, 431, 420, 426, and 432 and processing ends steps 417, 423, 429, 421, 427 and 433. Otherwise, the ballasts steps 436 and 437 are turned on or off by the latch mechanisms steps 434 and 435.

Figure 5:
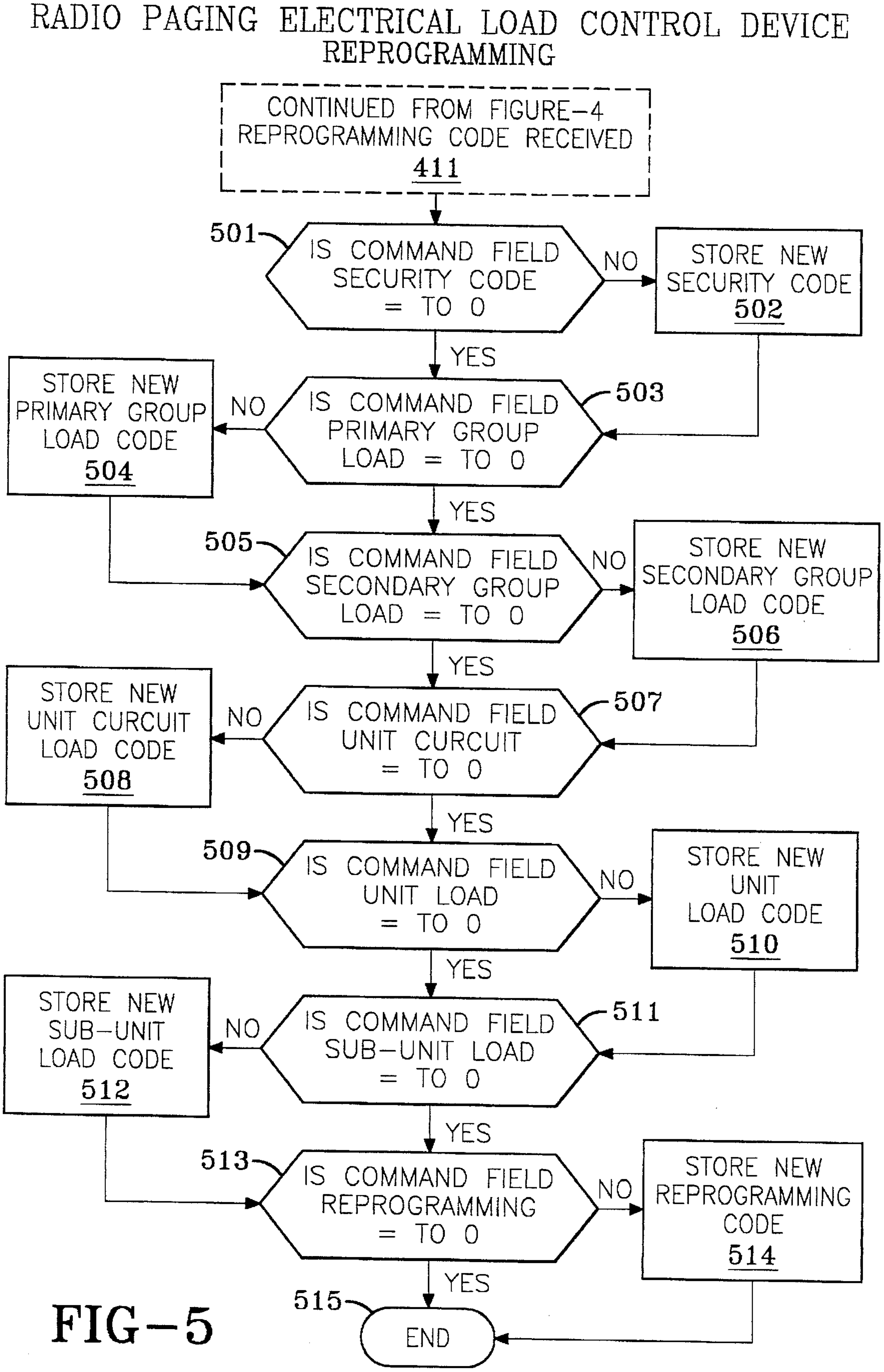
FIG. 5 is a flow chart illustrating the radio paging electrical load control system and device command operational sequence during reprogramming operation in accordance with a preferred embodiment of the present invention.

Turning now to FIG. 5, a flowchart describing the reprogramming operation of a preferred embodiment of the radio paging load control system is shown, in accordance with the present inventive concepts. The radio paging electrical load control device receives the signal command from the radio pager step 411. If the security code is not equal to zero step 501, the new security code is stored step 502. If the command field primary group code is not equal to zero step 503, the new primary group load code is stored in memory step 504. If the command field secondary group load code is not equal to zero step 505, the new secondary group code is stored in memory step 506. If the command field unit circuit code is not equal to zero step 507, the new unit circuit code is stored in memory 508. If the command field load action code is not equal to zero step 509, the new load action code is stored in memory step 510. If the command field sub-unit load code is not equal to zero step 511, the new sub-unit load code is stored step 512. If the command reprogramming field is not equal to zero step 513, the new reprogramming code is stored step 514. Processing ends step 515.

Figure 6A:
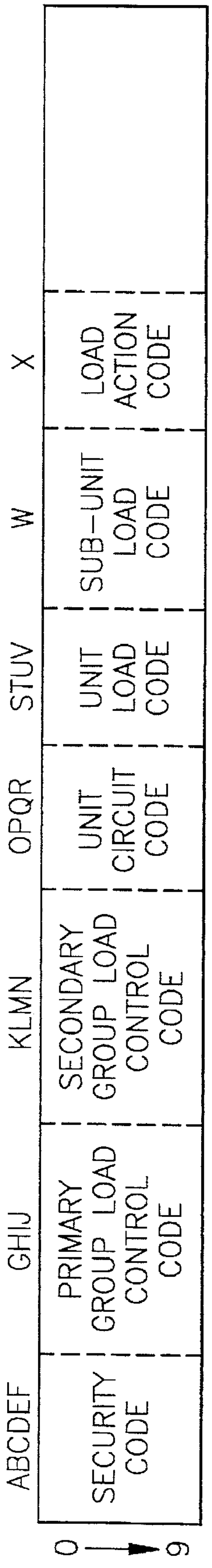
FIGS. 6(*a*) through 6(*c*) are diagrams illustrating specific command code formats of the radio paging electrical load control system in accordance with a preferred embodiment of the present invention, FIG. 6(*a*) is a normal operation command code format.
Figure 6B:
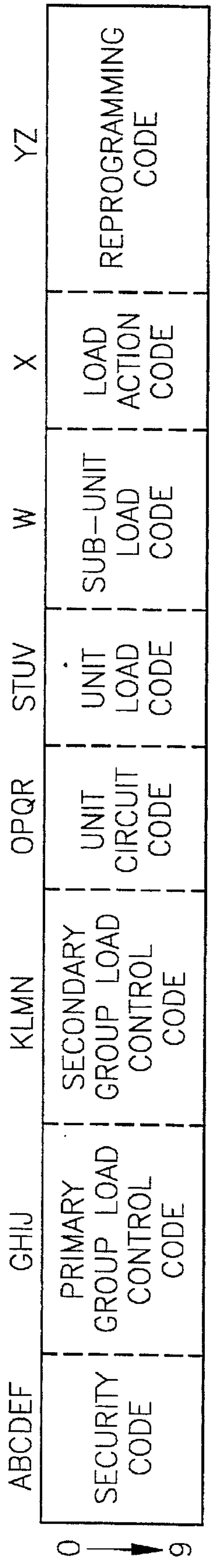
Figure 6C:
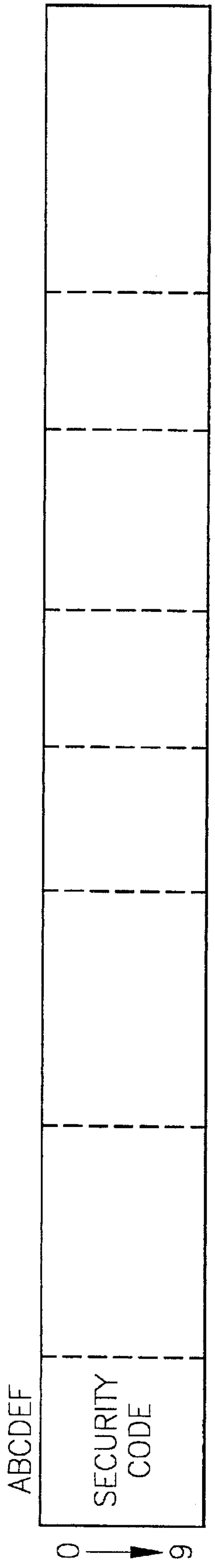

Turning now to FIG. 6, an example of a specific command code formats of a preferred embodiment of the radio paging load control system is shown, in accordance with present inventive concepts. FIG. 6(*a*) shows an example of a normal operation command code format. FIG. 6(*b*) shows an example of a reprogramming operation command code format. FIG. 6(*c*) shows an example of the security command code format.

Figure 7B:
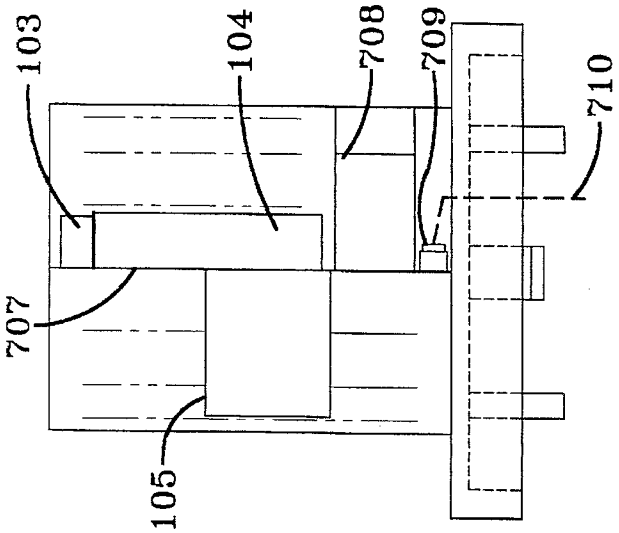
FIG. 7B is a side view of the radio paging electrical load control device as installed in a typical exterior light fixture in accordance with a preferred embodiment of the present invention.
Figure 7A:
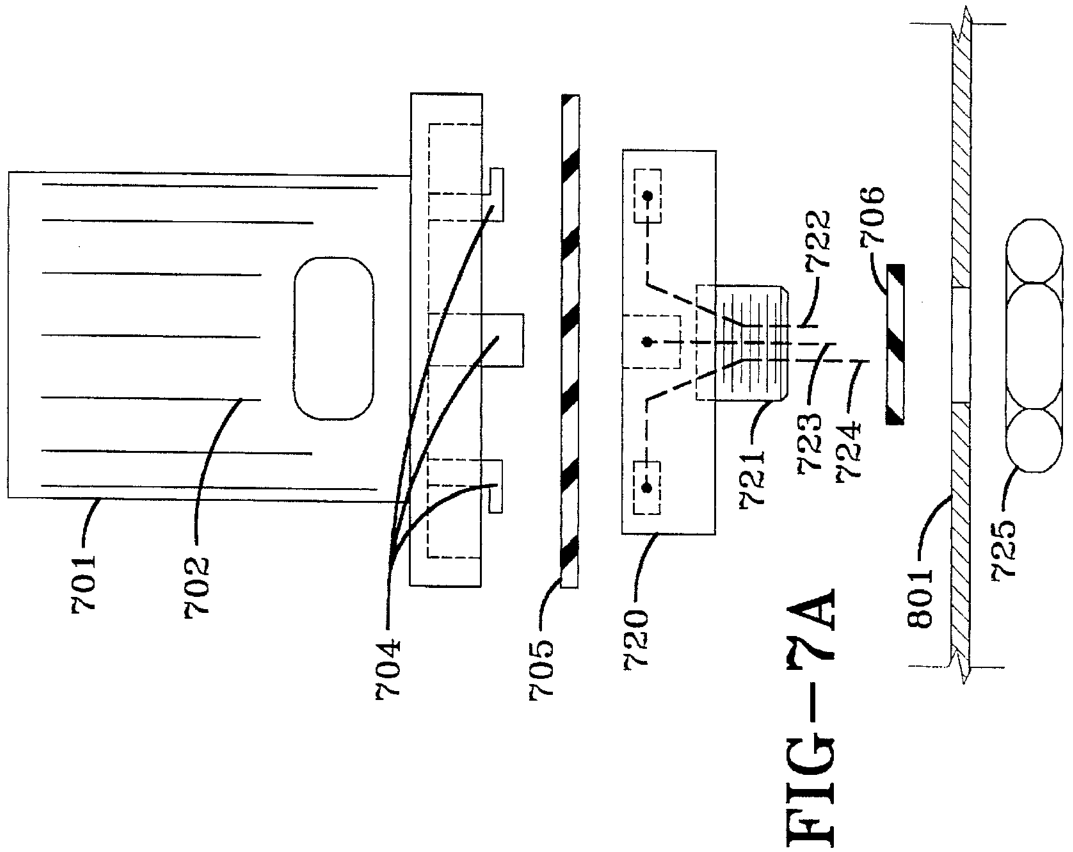
FIG. 7A is a front elevation of the radio paging electrical load control device as installed in a typical exterior light fixture in accordance with a preferred embodiment of the present invention.

FIG. 7A shows the front elevation of a preferred embodiment of the radio paging electrical load control device as installed in a typical exterior light fixture. This installation of the preferred embodiment is accomplished on an existing roadway lighting fixture by first removing the existing photoelectric twist lock day night photoelectric sensor and replacing it with the preferred embodiment of this device. The roadway lighting twist lock components housing 701 has cooling fins 702 and a photoelectric day/night sensor window 703. Power and switch connection blade/pins 704 are located on one end of the components housing 701. The power and switch connection blade/pins 704 are connected to a large weather proof gasket 705 which covers the existing lighting twist lock connection base 720 which has an electrical threaded connection 721. Power wiring 722, neutral wiring 723 and switch wiring 724 extend through the electrical threaded connection 721 and into the twist lock connection base 720 and extend through the a weather proof gasket 706 and into the roadway lighting fixture housing 801 which is secured to the lighting fixture by a threaded locknut 725. FIG. 7B is a side view of a preferred embodiment of the radio paging electrical load control device as installed in a typical exterior light fixture. The radio pager receiver 103 which receives commands from a remote location is installed within the twist-lock components housing 701 and is connected to the load control receiver circuitry processing unit 104 which decodes the commands which is in turn connected to the power and latch switching module 105 receives the decoded commands and is connected to the power control area barrier and printed circuit board 707. The photoelectric day/night sensor 708 located behind the photoelectric day/night sensor window 703 is connected to the load control receiver circuitry processing unit 104 and provides the capability of switching to turn lights on or off as needed based on the amount of daylight. The exterior maintenance infrared fiber-optic override input connector 709 which is connected to the infrared fiber optic cable 710 is also connected to the load control receiver circuitry processing unit 104 to provide for local override of the roadway lighting fixture.

Figure 8:
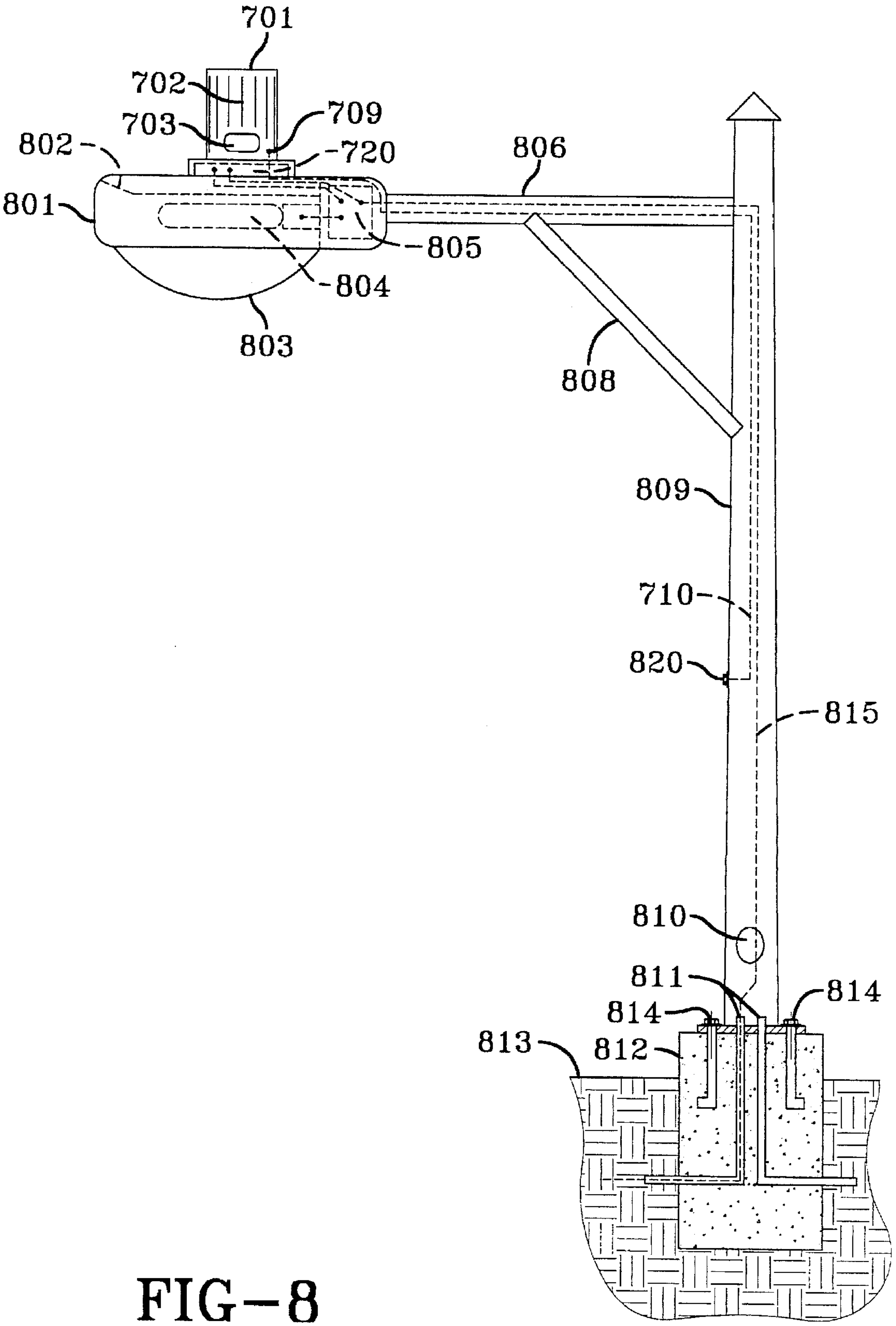
FIG. 8 is a side view of the radio paging electrical load control device as installed in a typical exterior roadway light fixture in accordance with a preferred embodiment of the present invention.

FIG. 8 is a side view of the radio paging electrical load control device as installed in a typical exterior roadway light fixture in accordance with a preferred embodiment of the present invention. A typical existing roadway lighting fixture housing 801 houses a reflector 802, lens 803, light source 804 and ballast 805. The fixture housing 801 is connected on one end to a typical existing roadway lighting hollow fixture standoff 806 which is connected on the opposite end to a mounting pole/tower 809. A wind brace 808 is connected on one end to the hollow mounting pole/tower 809 and on the other end is connected to and supports the hollow fixture standoff 806. The mounting pole/tower contains an electrical connections opening 810 that allows the electrical power feed conduits 811 to extend through the grade level 813 and the concrete support base 812 which fastens the mounting tower/pole 809 by mounting and leveling bolts 814. The electrical power feed conduits 811 allow the electrical power wiring 815 to extend into the hollow mounting pole/tower and through the fixture standoff 806 and into the roadway lighting fixture housing 801. An exterior maintenance fiber optic override input sensor 820 is located on the exterior side of the mounting pole/tower 809. A fiber optic cable 710 is connected to the override input sensor 820 on one end and extends through the hollow mounting pole/tower 809 and through the fixture standoff 806 into the roadway fixture housing 801 and connects to the exterior maintenance fiber optic override input connector 709. The photoelectric day/night sensor 708 is also connected to the exterior maintenance infrared fiber-optic override input connector 709 which is connected to the infrared fiber optic cable 710. The roadway lighting twist lock components housing 701 has cooling fins 702 and a photoelectric day/night sensor window 703.

Figure 9A:
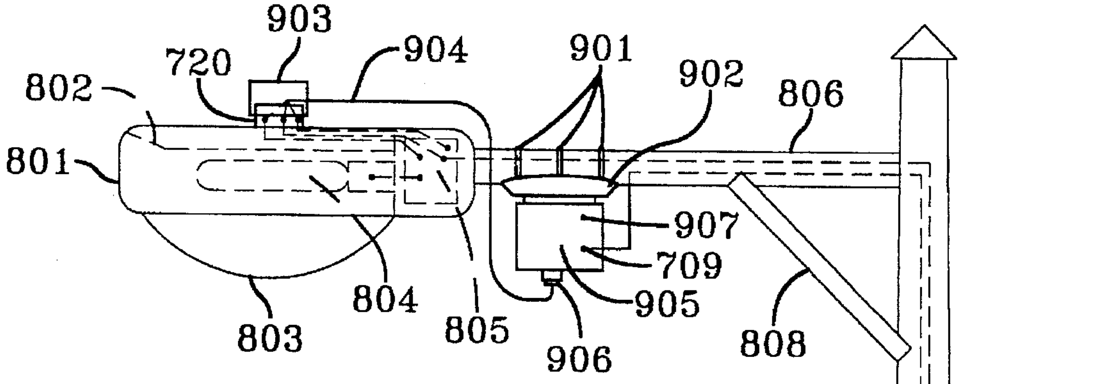
FIG. 9A is a side view of the radio paging electrical load control device as installed in a typical exterior roadway light fixture in accordance with a preferred embodiment of the present invention.
Figure 9A:
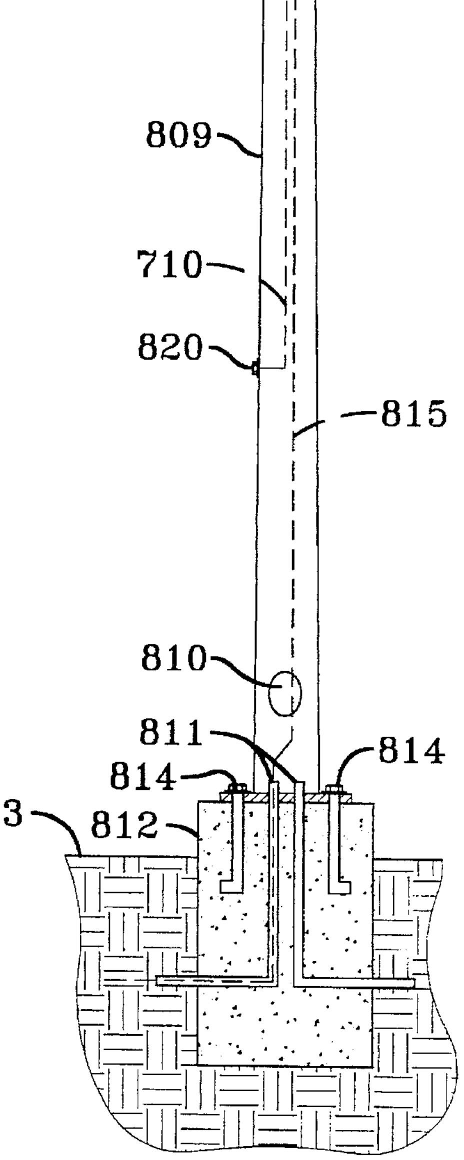

FIG. 9A is a side view of the radio paging electrical load control device as installed in a typical exterior roadway light fixture in accordance with a preferred embodiment of the present invention. This preferred embodiment allows the radio paging electrical load control device to be mounted remotely form the existing photoelectric twist lock connection base 720. A typical existing roadway lighting fixture housing 801 houses a reflector 802, lens 803, light source 804 and ballast 805. The fixture housing 801 is connected on one end to a typical existing roadway lighting hollow fixture standoff 806 which is connected on the opposite end to a mounting pole/tower 809. A wind brace 808 is connected on one end to the hollow mounting pole/tower 809 and on the other end is connected to and supports the hollow fixture standoff 806. The mounting pole/tower contains an electrical connections opening 810 that allows the electrical power feed conduits 811 to extend through the grade level 813 and the concrete support base 812 which fastens the mounting tower/pole 809 by mounting and leveling bolts 814. The electrical power feed conduits 811 allow the electrical power wiring 815 to extend into the hollow mounting pole/tower and through the fixture standoff 806 ad into the roadway lighting fixture housing 801. An exterior maintenance fiber optic override input sensor 820 is located on the exterior side of the mounting pole/tower 809, A fiber optic cable 710 is connected to the override input sensor 820 on one end and extends through the hollow mounting pole/tower 809 and through the fixture standoff 806 and into the weather proof components housing 905 which is mounted on the fixture standoff 806 by a mounting bracket 902 and connects to the exterior maintenance fiber optic override input connector 709, A stainless steel strap 901 further attaches the mounting bracket 902 to the fixture standoff 806. The photoelectric day/night sensor 907 located within the components housing 905 provides the capability of switching to turn lights on or off as needed based on the amount of daylight. The exterior maintenance infrared fiber-optic override input connector 709 which is connected to the infrared fiber optic cable 710 is also connected to the load control receiver circuitry processing unit 104 to provide for local override of the roadway lighting fixture, One end of the weather proof and sunlight resistant flexible power cord 904 is attached to the components housing through a weather proof flexible cord strain relief 906. The opposite end of the weather proof and sunlight resistant flexible power cord 904 attaches to a weather proof, twist lock cord plug 903 (similar to Hubbell 7567) which is mounted on the photoelectric twist lock connection base 720 of the roadway lighting fixture housing 801.

Figure 9B:
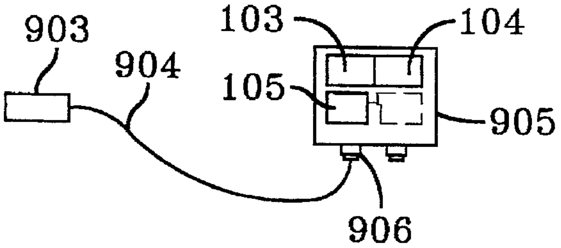
FIG. 9B is a side view of the radio paging electrical load control device housing as installed in a typical exterior roadway light fixture in accordance with a preferred embodiment of the present invention.

FIG. 9B is a side view of the radio paging electrical load control device housing as installed in a typical exterior roadway light fixture in accordance with a preferred embodiment of the present invention. Within the weather proof components housing 905, the radio pager receiver 103 which receives commands from a remote location is connected to the load control receiver circuitry processing unit 104 which decodes the commands and is in turn connected to the power and latch switching module 105 which receives the decoded commands and is also connected to one end of the weather proof and sunlight resistant flexible power cord 904. The opposite end of the weather proof and sunlight resistant flexible power cord 904 attaches to a weather proof, twist lock cord plug 903 (similar to Hubbell 7567) which is mounted on the roadway lighting fixture housing 801.

Figure 10:
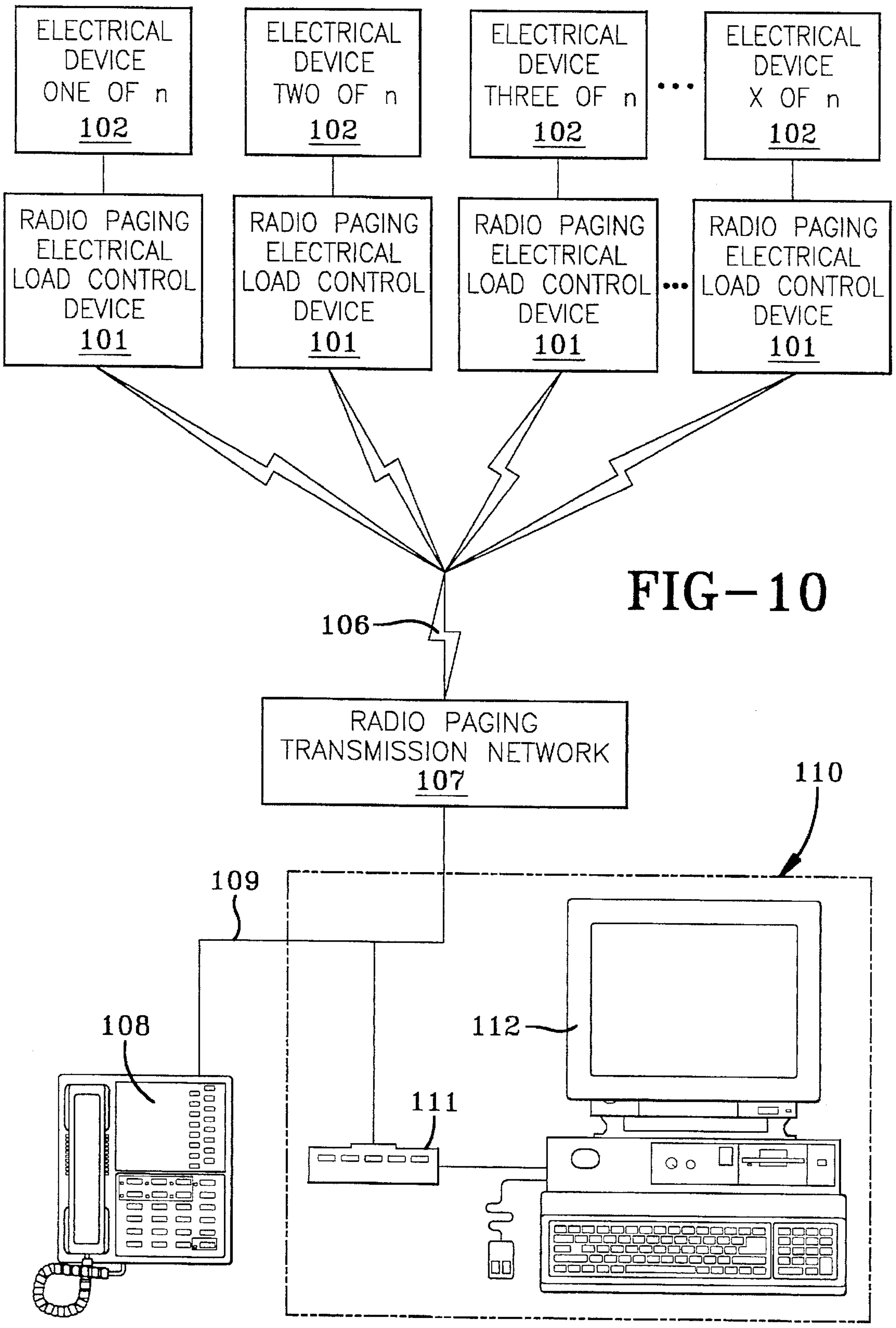
FIG. 10 is a system diagram of a radio paging electrical load control system which shows the radio paging transmission network communicating with a number of radio paging electrical load control devices which are connected to electrical load control devices.

Turning now to FIG. 10, a system diagram of a preferred embodiment of the radio paging electrical load control system is shown in accordance with the present inventive concept. In FIG. 10, the paging network 107 sends a command signal transmission 106 entered via the computer 112 and modem 111 or the telephone 108 and are transmitted over the telephone network 109 to the radio paging transmission network 107. The paging network 107 sends the command to a plurality of radio paging electrical load control devices 101, each of which is connected to an electrical device 102.

Figure 11:
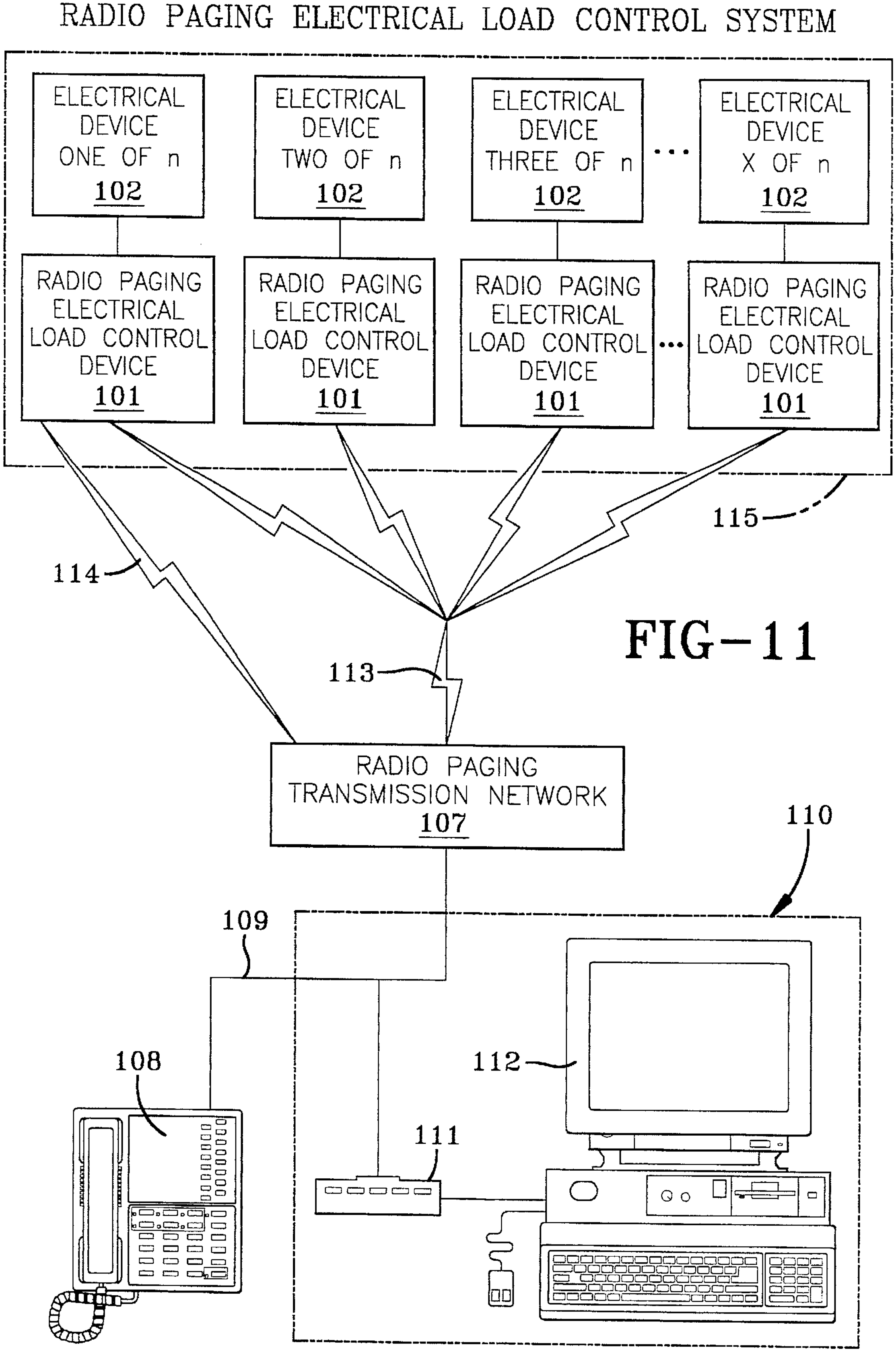
FIG. 11 is a system diagram of a radio paging electrical load control system which shows the radio paging transmission network communicating with radio paging electrical load control devices as a group, yet still being able to individually control the state of a device while it is part of the group.

Turning now to FIG. 11, a system diagram of a preferred embodiment of the radio paging electrical load control system is shown in accordance with the present inventive concept. In FIG. 11, the electrical devices 102 are grouped together to form a group of devices 115. Commands are entered via a computer 112 and modem 111 or the telephone 108 and are transmitted over the telephone network 109 to the radio paging transmission network 107. The paging network 107 sends one group command signal transmission 113, which is received by all radio paging electrical load control devices 101 in the device group 115. Alternatively, the paging network 107 sends a unit command signal transmission 114 to an individual radio paging electrical load control device 101 to control the state of a single device 102, even while the device is part of the larger electrical device group 115. The number of electrical device groups 115 is shown as n, since there can be any number of electrical device groups.

What is claimed is:

1. A radio paging electrical load control device for controlling the operational state of a single electrical light fixture or group of light fixtures, comprising:

a. a housing to be connected to an existing light fixture;

b. a receiver for accepting coded digital commands located within the housing;

c. a processor located within the housing and connected to the receiver for decoding received commands;

d. a lighting controller connected to the processor for accepting decoded commands and connected to the lighting unit for performing the command operation on the electrical light fixture;

e. a power supply connected to the receiver, processor and lighting controller;

f. the digital commands received and processed allow for:

I. the remote control of the operational state of a single electrical light fixture;

II. the remote programming and reprogramming of the electrical light fixtures into groups; and III. the remote control of the operational state of a group of electrical light fixtures with one command while still being able to individually control the state of any single light fixture even while the fixture is part of the larger group of electrical light fixtures; and g. said remote control of the operational state is accomplished by wireless communication.

2. A radio paging electrical load control device for controlling the operational state of an electrical light fixture or group of light fixtures, according to claim 1, further comprising a photoelectric sensor contained within the housing and connected to the controller for controlling the state of the electric light fixture according to the amount of daylight.

3. A radio paging electrical load control device for controlling the operational state of a single electrical light fixture or group of fixtures, according to claim 1, further comprising an infrared receiver contained within the housing and connected to the processor for accepting commands from an infrared remote control device.

4. A radio paging electrical load control device for controlling the operational state of a single electrical light fixture or group of fixtures, according to claim 1, further comprising a hardwired switch connected to the processor for manually overriding the state of the electric light fixture.

5. A radio paging electrical load control device connected to and located within or nearby an electrical light fixture for controlling the operational state of the electrical light fixture or groups of fixtures, according to claim 1, wherein the remote control of the operational state of an electric light fixture or group of electric light fixtures is set to the state specified in the digital input command and overrides the current state of the light fixture, even if the light fixture is physically set to off by a manual switch.

6. A radio paging electrical load control device for controlling the operational state of the electrical light fixture or groups of fixtures, according to claim 1, further comprising the capability of the digital commands received and processed to remotely control the light level of the electrical light fixture or groups of fixtures.

7. A radio paging electrical load control device for controlling the operational state of the electrical light fixture or groups of fixtures, according to claim 1, wherein the digital commands received and processed are alphanumeric paging commands.

8. A radio paging electrical load control device for controlling the operational state of the electrical light fixture or groups of fixtures, according to claim 1, wherein the digital commands received and processed are binary coded decimal paging commands.

9. A radio paging electrical load control device for controlling the operational state of a single electrical light fixture or group of fixtures, according to claim 2, wherein the housing is connected to a roadway light.

10. A radio paging electrical load control device for controlling the operational state of a single electrical light fixture or group of fixtures, according to claim 3 wherein the housing is connected to a roadway light.

11. A radio paging electrical load control device for controlling the operational state of a single electrical light fixture or group of fixtures, according to claim 4, wherein the housing is connected to a roadway light.

12. A radio paging electrical load control device for controlling the operational state of a single electrical light fixture or group of light fixtures, according to claim 1, further comprising a power cord extending outward from the housing for connecting the housing to an existing light fixture.

13. A radio paging electrical load control device for controlling the operational state of a single electrical light fixture or group of fixtures, according to claim 12, further comprising:

a. an infrared override input receiver contained within the housing and connected to the processor; and b. a photoelectric sensor contained within the housing and connected to the lighting controller.

14. A radio paging electrical load control device for controlling the operational state of a single electrical light fixture or group of fixtures, according to claim 13, wherein the power cord extending outward from the housing is connected to a roadway light.

15. A radio paging electrical load control device for controlling the operational state of the electrical light fixture or groups of fixtures, according to claim 13, wherein the processor comprises:

a. a decoder for decoding the received commands;

b. a non-volatile memory device for storing security, reprogramming, operational state data and unit and group data;

c. a central processing unit for comparing the decoded commands to the data stored in the memory device and storing new data for reprogramming in the memory device;

d. the security, reprogramming, operational state data and unit and group data remains stored in the non-volatile memory device until new data is received; and e. the stored operational data is used to reenergize the state of the fixture or group of fixtures after a power interruption to the same operational state as prior to the power interrupt.

16. A radio paging electrical load control device for controlling the operational state of a single electrical light fixture or group of fixtures, according to claim 15, further comprising the capability of the processor of momentarily delaying the control and staggering the operation of the roadway electrical lighting control group so as to prevent a huge inrush of current.

17. A radio paging electrical load control device for controlling the operational state of a single electrical light fixture or group of fixtures, according to claim 15, further comprising the capability of the processor of remotely programming and reprogramming the roadway light fixture control group and unit and the capability of remotely programming and reprogramming and storing a new security code.

18. A method of using a radio paging electrical load control system for controlling the operational state of a single electrical light fixture or group of fixtures, comprising:

a. sending electrical light fixture control commands;

b. receiving electrical light fixture control commands;

c. decoding the received control commands using a processing unit connected to the receiving means;

d. using a lighting controller circuit for accepting the decoded command and performing the controlling operation on the electrical light;

e. the digital commands received and processed allow for:

I. remotely controlling the operational state of a single electrical light fixture;

II. remotely programming and reprogramming of the electrical light fixtures into groups; and III. remotely controlling the operational state of a group of electrical light fixtures with one command while still being able to individually control the state of any single light fixture even while the fixture is part of the larger group of electrical light fixtures; and f. accomplishing said remote control of the operational state by means of wireless communication.

19. A method of using a radio paging electrical load control system for controlling the operational state of a single electrical light fixture or group of fixtures, according to claim 18, wherein:

a. the sending of commands is via a radio paging network; and b. the receiving of commands is via a pager receiver located within or nearby an electrical light fixture.

20. A method of using a radio paging electrical load control system for controlling the operational state of a single electrical light fixture or group of fixtures, according to claim 18, wherein:

a. the sending of commands is via an infrared device; and b. the receiving of commands is via an infrared receiver located within or nearby an electrical light fixture.

21. A method of using a radio paging electrical load control system for controlling the operational state of a single electrical light fixture or group of fixtures, according to claim 18, wherein the sending of commands is via a photoelectric sensor located within or nearby an electrical light fixture.

22. A radio paging electrical load control device for controlling the operational state of a single electrical light fixture or group of fixtures, according to claim 12, further comprising, the capability of reenergizing the state of the electrical light fixture or group of fixtures after a power interruption to the same operational state as prior to the power interruption.

23. A radio paging electrical load control device for controlling the operational state of a single electrical light fixture or group of fixtures, according to claim 1, wherein the housing is connected to a roadway light.

24. A radio paging electrical load control device for controlling the operational state of a single electrical light fixture or group of fixtures, according to claim 23, further comprising, the capability of reenergizing the state of the electrical light fixture or group of fixtures after a power interruption to the same operational state as prior to the power interruption.

25. A radio paging electrical load control device for controlling the operational state of a single electrical light fixture or group of fixtures, according to claim 23, further comprising the capability of the processor of momentarily delaying the control and staggering the operation of the roadway electrical lighting control group so as to prevent a huge inrush of current.

26. A radio paging electrical load control device for controlling the operational state of a single electrical light fixture or group of fixtures, according to claim 23, further comprising the capability of the processor of remotely programming and reprogramming the roadway light fixture control group and unit and the capability of remotely programming and reprogramming and storing a new security code.

27. A radio paging electrical load control device for controlling the operational state of a single electrical device or group of devices, comprising:

a. a housing to be connected to an existing electrical device;

b. a receiver for accepting coded digital commands located within the housing;

c. a processor located within the housing and connected to the receiver for decoding received commands;

d. a controller connected to the processor for accepting decoded commands and connected to the electrical device for performing the command operation on the electrical device; and e. a power supply connected to the receiver, processor and controller;

f. the digital commands received and processed allow for:

I. the remote control of the operational state of a single electrical device;

II. the remote programming and reprogramming of the electrical devices into groups; and III. the remote control of the operational state of a group of electrical devices with one command while still being able to individually control the state of any single electrical device even while the fixture is part of the larger group of electrical devices; and g. said remote control of the operational state is accomplished by wireless communication.

* * * * *